United States Patent [19]
Burns

[11] 4,070,092
[45] Jan. 24, 1978

[54] ACTIVE WAVEGUIDE BRANCH WITH VARIABLE SYNCHRONISM

[75] Inventor: William K. Burns, Alexandria, Va.

[73] Assignee: The United States of America as represented by the Secretary of the Navy, Washington, D.C.

[21] Appl. No.: 725,904

[22] Filed: Sept. 22, 1976

[51] Int. Cl.² ............................................. G02B 5/14
[52] U.S. Cl. ...................... 350/96 C; 350/96 WG; 350/160 R
[58] Field of Search ........... 350/96 C, 96 WG, 160 R

[56] References Cited
U.S. PATENT DOCUMENTS

| | | | |
|---|---|---|---|
| 3,695,745 | 10/1972 | Furukawa | 350/96 WG |
| 3,795,433 | 3/1974 | Channin | 350/96 WG |
| 3,883,220 | 5/1975 | Taylor | 350/96 WG |

OTHER PUBLICATIONS

Milton, A. Fenner, "Optical Fiber Applications" AGARD Lecture Series No. 76 on Electro-Optical Systems London, England, May 19–20, 1975, pp. 8-1 to 8-21.
M. Ohmachi, J. Noda "Electro–optic Light Modulator..." Applied Physic Lett vol. 27, No. 10, Nov. 1975, pp. 544–546.

*Primary Examiner*—John K. Corbin
*Assistant Examiner*—Rolf Hille
*Attorney, Agent, or Firm*—R. S. Sciascia; Philip Schneider; Melvin L. Crane

[57] ABSTRACT

An active optical-waveguide branch which has the maximum possible switching efficiency and minimum length. The waveguide includes a single main waveguide branched into two element arms or paths such that optical radiation passing through the main waveguide will be normally divided equally into each branched arm. Electrodes are formed between the branching arms and on the outer side of each arm. The electrodes are connected electrically so that the potential between the center electrode and each of the outer electrodes may be either negative or positive with each outer electrode having the same potential with respect to the center electrode. The optical radiation will choose one arm or the other depending on the polarity of the potential applied. The electrode separation is preferably a decreasing function of the length, $z$, of the electrode along the length of the arms. That is, for a constant voltage on the electrodes, the mode synchronism is a function of the length, $z$.

4 Claims, 9 Drawing Figures

ACTIVE WAVEGUIDE BRANCH WITH VARIABLE SYNCHRONISM

BACKGROUND OF THE INVENTION

This invention relates to the switching of optical power in an active branching waveguide.

The operation of passive branching waveguides has been described in an article by W. K. Burns and A. F. Milton, *IEEE J. Quantum Electron,* QE-11, 32, 1975 and by H. Yajima, *Applied Physics Letter,* 22, 647 (1973). These articles show that if the branch taper is sufficiently slow, modes will propagate through the branch adiabatically. Adiabatic propagation implies a slow enough change in waveguide parameters that the power in the lowest-order, local normal mode remains in the lowest-order mode, and power in the second-order, local normal mode remains in that mode through the transition represented by the branch. There is no mode conversion, or power transfer, between the local normal modes. Also for sufficient separation of the branch arms, the local normal modes tend to change their distribution of optical power between the arms of the branch until they exist primarily in one arm of the branch or the other. For example, in a branch that supports two local normal modes, the lowest-order mode will select one arm of the branch and the second-order mode will select the other arm of the branch. An exception to this occurs if the branch is exactly symmetrical, then the modal evolution described above does not occur and instead the mode power associated with both local normal modes divides equally between the arms of the branch. Prior art U.S. Pat. No. 3,883,220 (Taylor) describes an active branching waveguide in which the index of refraction of one arm of the branch is reduced to or below the index of refraction of the substrate. That arm of the branch is said to be "cut-off" and propagation can only occur in the other arm of the branch. Prior art U.S. Pat. No. 3,795,433 (Channin) is similiar in that one or the other arms of the branch is electro-optically created, the other being cut-off.

SUMMARY OF THE INVENTION

This invention is directed towards an improved optical, active branching waveguide which may be used as an optical switch or modulator. The branching waveguide has a raised index of refraction, such as obtainable from diffusion in an electro-optic crystal, with electrodes placed outside of and between the arms of the branch. The first improvement lies in requiring the branch to be geometrically symmetrical, with the capability of imposing an electrically controlled, reversible, index-of-refraction asymmetry. The index of refraction of one arm of the branch is electro-optically raised by a small amount, $\Delta n$, and the index of the second arm is lowered by the same amount. The effect of these changes is to switch the optical power to the arm of the branch with the higher index. Since the electro-optical index change is small compared to the waveguide-substrate index difference, optical switching is achieved with less electrical power than prior-art devices. Both arms of the branch retain their waveguiding properties and are not cutoff. Other requirements are that a single local normal mode must be injected into the device and it must propagate adiabatically through the branch when the electro-optic index changes are applied. The latter requirement is achieved by making the branch angle sufficiently small.

A second improvement is obtained from an electrode configuration in which the electrode separation is generally a decreasing function of distance along the branching arms. This produces a variable mode synchronism and has the effect of reducing the abruptness of the transition caused by the introduction of the electrodes. This, in turn, increases the desired adiabatic nature of the propagation through the branch. Optimum design of the variable mode synchronism should allow the construction of maximum-efficiency switching devices with minimum length.

DETAILED DESCRIPTION

Figures 1, 1A:
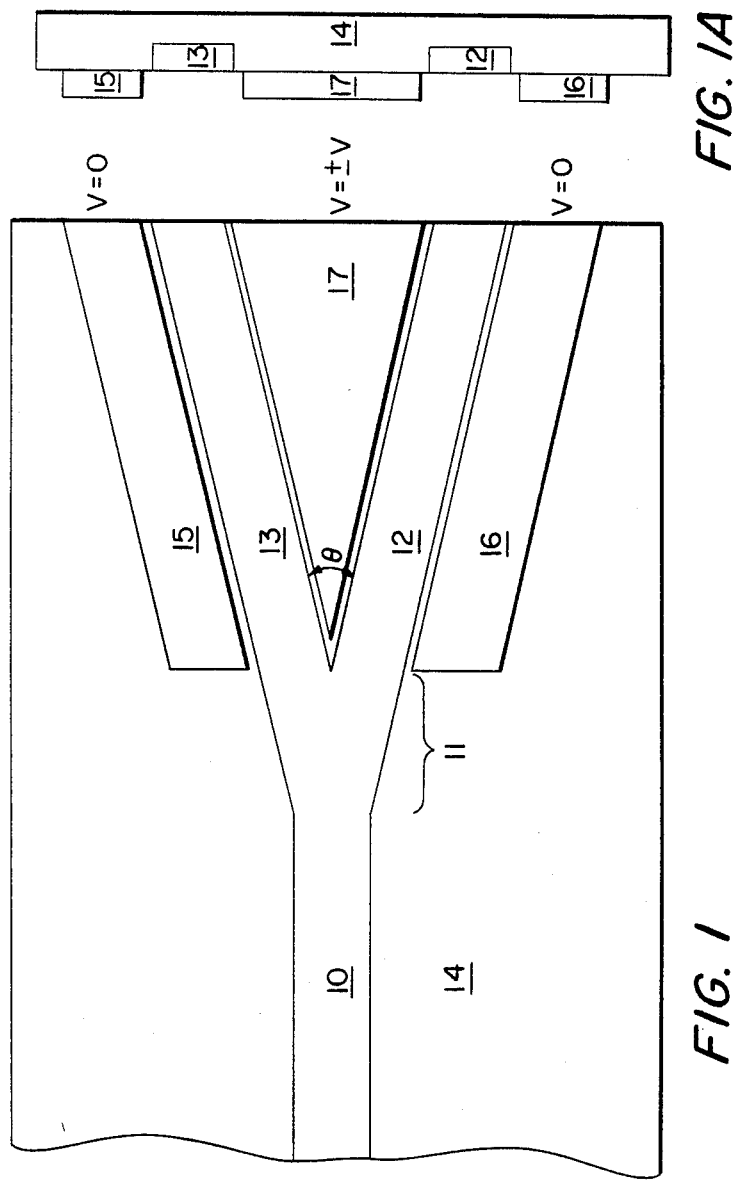
FIG. 1 illustrates a two-dimensional view of the device with constant electrode separation.
FIG. 1A is an end view of FIG. 1.

FIG. 1 of the drawing shows a two-dimensional, active, branching waveguide made in accordance with the teaching of this invention. As shown, the waveguide includes a main section 10 which supports only a single local normal mode. This section expands adiabatically to twice its width in an expansion section 11. Then the waveguide extends into two branching divergent arms 12 and 13 which extend outward at a branch angle $\theta$. This branching occurs symmetrically about the center line of the device and the arms 12 and 13 are of equal width, and equal to the width of section 10. The waveguide sections 10, 11 and arms 12 and 13 are of a higher index of refraction than the substrate 14 which extends along each side and below the waveguiding sections. These guides may be formed, for example, by diffusing titanium or other transition metal element into electro-optic $LiNbO_3$ or $LiTaO_3$ to slightly raise (such as by $10^{-2}$) the index of refraction.

Electrodes 15 and 16 extend along the outside of branching arms 12 and 13, and electrode 17 lies along the inside between arms 13 and 14 covering the area of the subtrate between the branching arms, with the electrodes applied onto the substrate 14. Means must be provided to ground electrodes 15 and 16 and apply a voltage of positive or negative polarity of electrode 17, or vice versa. Since the branching arms are symmetrical about the center line and the arms of the branch have the same width and index of refraction, an incident local normal mode will divide its power equally between the arms of the branch when no voltage is applied.

Figures 2, 2A:
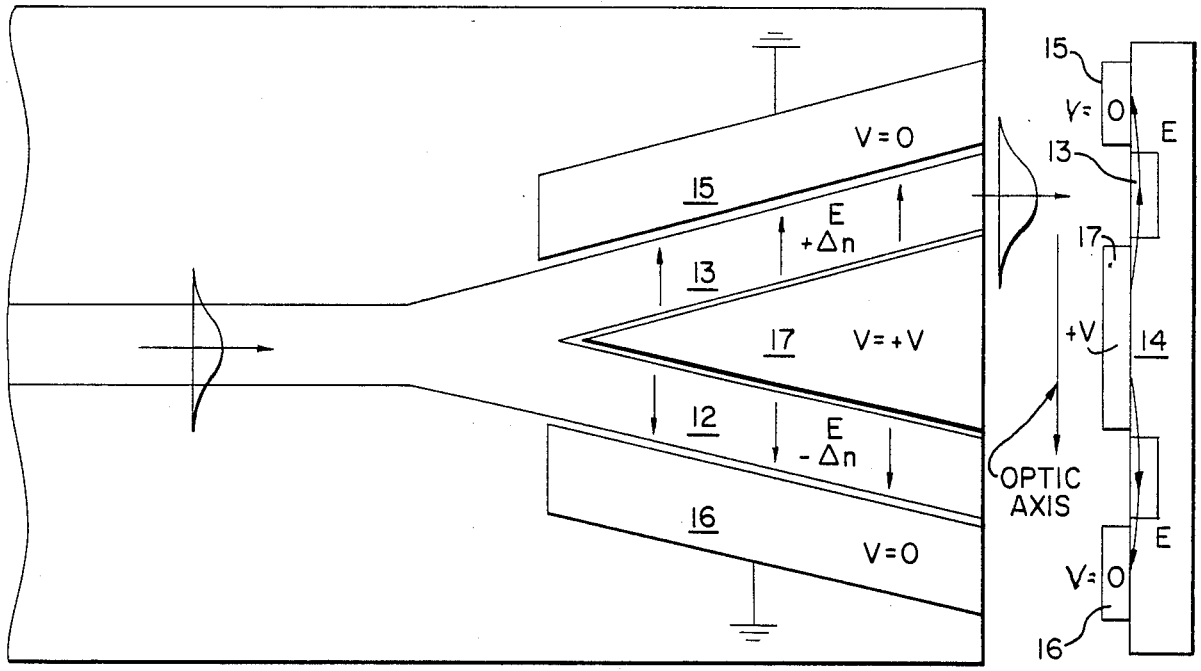
FIG. 2 illustrates the electric field direction, electro-optic index changes, and optical power path when positive voltage is applied to the center electrode of the device of FIG. 1.
FIG. 2A is an end view of FIG. 2.
Figures 3, 3A:
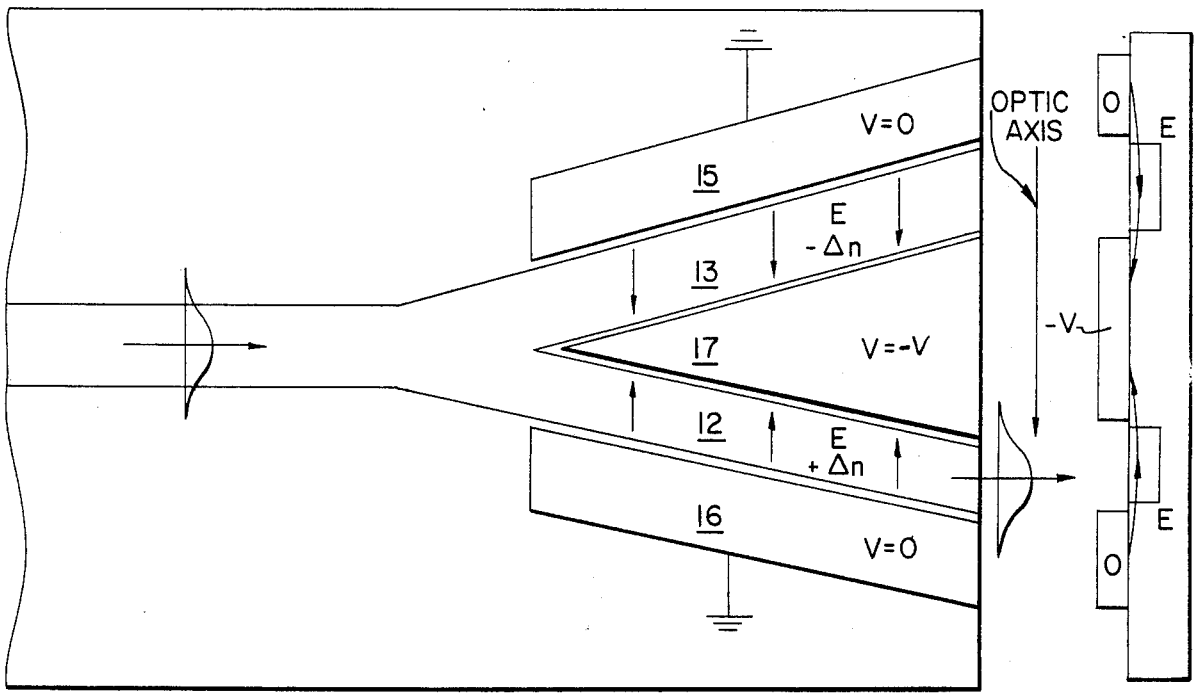
FIG. 3 illustrates the effect of applying negative voltage to the center electrode of the device of FIG. 1.
FIG. 3A is an end view of FIG. 3.

FIGS. 2 and 3 illustrate operation of the active branch with positive and negative voltages applied to the center electrode 17, respectively. In FIG. 2, an electric field is set up across each arm of the branch from the center electrode 17 to the outer electrodes 15 and 16. The electro-optic crystal must be oriented with its optic axis as shown by the arrow marked "Optic Axis" so that it is parallel to the electric field across one arm and anti-parallel to the electric field across the other arm. Then the effect of the electric field across the electro-optic arms of the branch will be to raise the index of refraction in one arm (13) and lower it in the other arm (12) by the same amount, $\Delta n$, through the electro-optic effect. Note that both arms of the branch are still acting as waveguides since $\Delta n$ may be small, (typically 10%) compared to the index difference between the arms of the branch and the substrate. This implies that the electric power required to operate the optical switch will be less than that required in the prior art. The effect of the index changes will be to make the branch asymmetric and the local normal mode will undergo modal evolution until all its power is in one arm 13 of the branch.

In FIG. 3, the sign of the voltage applied to the center electrode is reversed from that shown in FIG. 2, reversing the direction of the electric fields across each arm. This changes the sign of the index change in each arm and has the effect of reversing the asymmetry of the branch. Since the geometry is reversed, the local normal mode now selects the other arm 12 of the branch and electrically controlled optical switching is achieved.

It should be clear that grounding the center electrode 17 and applying positive and negative voltage to the outer electrodes 15 and 16 will produce equivalent effects.

Figure 4:
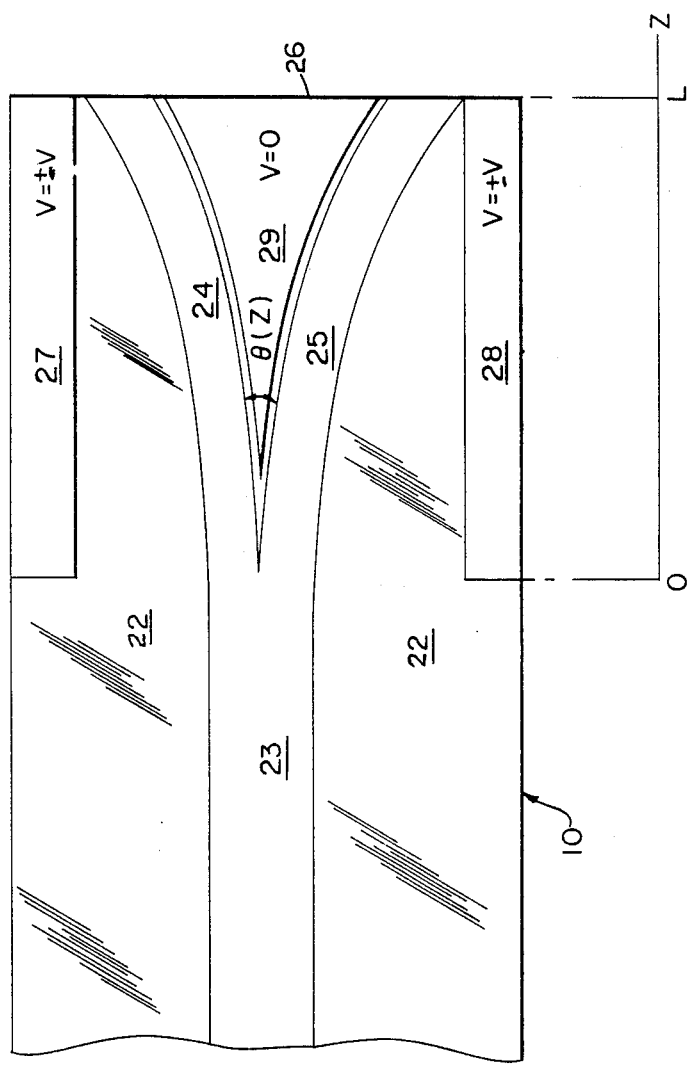
FIG. 4 illustrates a top view of a device with decreasing electrode separation.
Figure 5:
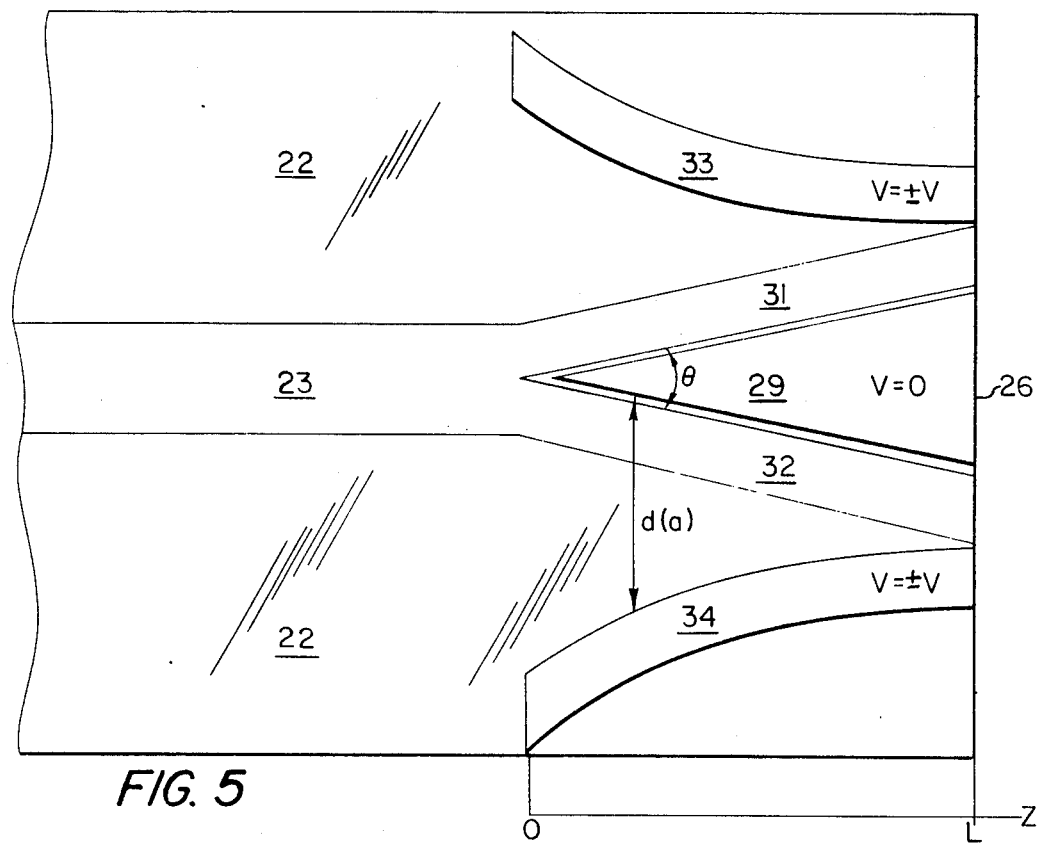
FIGS. 5 and 6 are modifications of the device illustrated in FIGS. 1 and 4.
Figure 6:
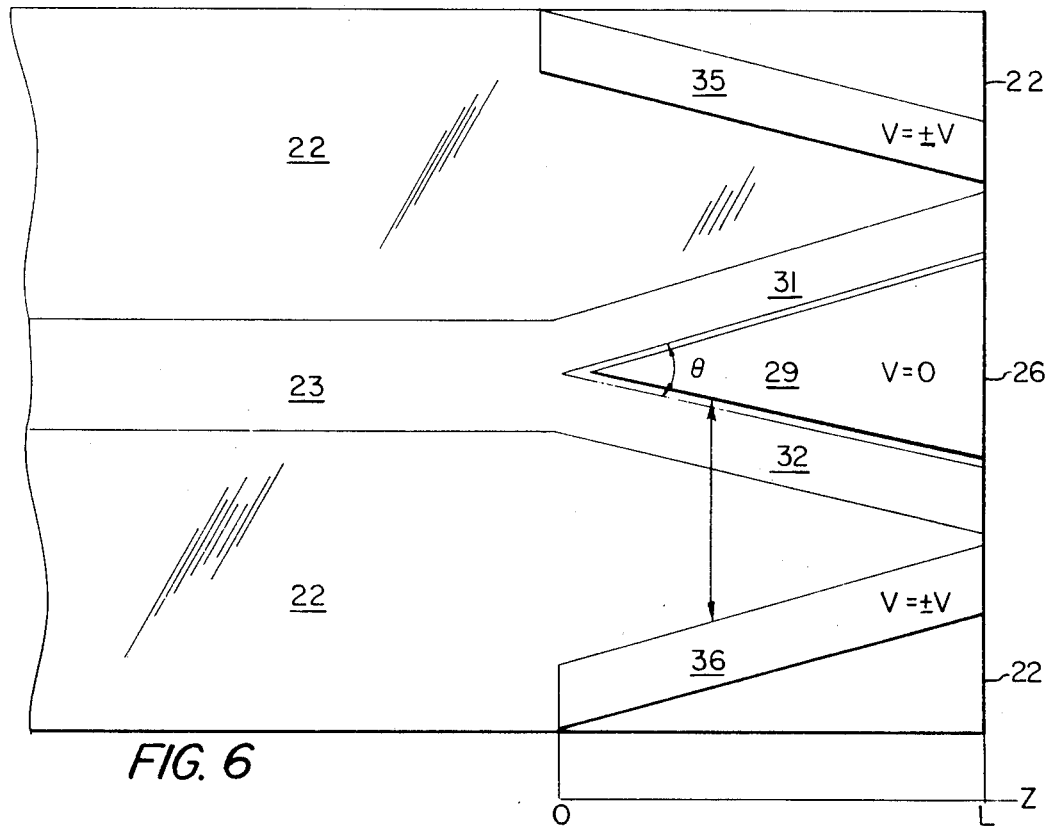

The sole purpose of the single-mode, main waveguide section 10 and expansion section 11 is to ensure that only a single local normal mode is incident upon the arms of the branch. This requirement is apparent since any power in the second local normal mode will select the other arm of the branch and cross talk in the switching will result. However, if other means are taken to ensure excitation by a single local normal mode, the main waveguide section 10 could be made twice as wide and the expansion section 11 eliminated. Variations of the device in FIGS. 4, 5 and 6 are illustrated in this manner.

Modal propagation through the active branch is required to be abiabatic, thus avoiding power transfer to a second local normal mode and resulting optical crosstalk. Such power transfer could occur in the expansion section, at the introduction of the electrodes, in the body of the branch, and at the termination of the electrodes. Power transfer in the body of the branch depends on the value of the parameter $$y = \frac{\Delta \beta}{\theta \delta} \quad (1)$$

as explained in the teachings of Burns and Milton, referred to above, where $\Delta \beta$ is the mode synchronism, or difference in mode propagation constant at large branch separation, $\theta$ is the branch angle, and $\gamma$ is the transverse momentum component in the region between the arms of the branch. This contribution to power transfer is always small for values of $y \geq 2$, which can be achieved by making the branch angle small enough. This condition corresponds to adiabatic propagation.

Power transfer between the local normal modes at the introduction and termination of the electrodes are special cases of power transfer at abrupt transmissions as explained in Burns, et al, *Applied Optics*, 15, page 1053 (1976). Power transfer depends, in each instance, on the change in the value at the parameter $$X = \frac{\Delta \beta}{2K} \quad (2)$$

that occurs at the transition, where K is the coupling constant between the arms of the branch. The mode synchronism or difference in mode propagation constant $\Delta \beta$ can be represented as $$\Delta \beta = k N_b^3 r_{eo} E \quad 3a$$

where $$E = \frac{V}{d} \quad (3b)$$

and $K = 2\pi/\text{wavelength}$
$N_b$ = substrate index of refraction
$r_{eo}$ = electro-optic coefficient
$E$ = electric field across each arm of the branch
$V$ = voltage applied to electrodes
$d$ = distance between electrodes across each branch arm.

Consider, in particular, the abrupt transition caused by the introduction of the electrodes. Before the electrodes begin, $\Delta \beta$ and X are both equal to 0. Just after the electrodes begin, X is given by Eq. 2 and 3 for given values of applied voltage V and electrode separation $d$. The power lost by power transfer is proportional to this value of X. If it is reduced by reducing V, the device length L tends to be long. A second improvement of this invention is to reduce the abrupt nature of this transition in X by adjusting the electrode separation $d$ so that it generally decreases along the length of the branch. This allows the change in $\Delta \beta$ and X at the transition to be quite small and reduces the resulting power transfer. However, the voltage applied, V, can still be quite large and the device length, L, can be minimized. Varying $d$ with propagation direction Z implies a variable mode synchronism $\Delta \beta$ with Z. The requirement of $y = \Delta \beta / \theta \gamma \geq 2$, mentioned previously, must now be treated as a local condition. This will also be the case if the branch angle $\theta$ is a function of Z, as in FIG. 4.

Three ways in which a variable electrode separation and resulting mode synchronism can be achieved are illustrated in FIGS. 4–6.

In FIG. 4, the main optical waveguide section 23 is joined by or extends into two branching divergent arms 24 and 25 separated by a variable angle $\theta$. The branching arms extend outwardly on an arc so that the distance between the arms becomes greater at a faster rate than they would if extending in straight lines. The two arms are separated by a portion 26 of the substrate 22 and both arms have the same index of refraction.

An electrode 27 is formed on the substrate parallel to the axis of the system and extends along the length of the upper arm with the outer end of the electrode adjacent the output end of the upper branching arm. An electrode 28 is also formed on the substrate parallel with the axis of the system and extends along the length of the bottom arm with the outer end of electrode 28 adjacent the output end of the bottom arm. Also, the electrodes 27 and 28 are parallel and equidistant from the axis of the system. An electrode 29 is formed on the substrate between the upper and lower arms, extending across the spacing between the arms, with its outer edges having the same curvature as that of the arms.

Since the outer electrodes are parallel with the axis and the central electrode is arcuate, the spacing between the inner and outer electrodes decreases from the input end of the arms to the output end of the arms. Therefore, the separation is a generally decreasing function of the distance along the branch.

FIG. 5 is a modification of the waveguide illustrated in FIG. 4. In the device of FIG. 5, the branching waveguide arms 31 and 32 diverge in straight lines such as in the prior art. However, the outer electrodes 33, 34 are curved and slanted so that the end closest to the system axis is the electrode end near the output ends of the branching arms. Thus, the greatest distance between the central electrodes and the outer electrodes is at the input to the branching arms as in the waveguide of FIG. 4.

In the modification shown by FIG. 6, the waveguide structure is the same as shown in FIG. 5 except that the outer electrodes 35, 36 are straight and converge toward the output end of the waveguide arms.

In each of the species shown, the electrode separation, $d$, is a generally decreasing function of the distance, $z$, where $z$ is the axial distance from the input end to the output end of the branches. The exact dependence of $d$ on $z$ is chosen so that the device length, $L$, is a minimum for a given power transfer. A minimum length, $L$, can be achieved by use of a constant voltage, $V$, in each of the configurations shown by illustration in FIGS. 4–6, or in some combination of them.

The channel waveguide can be fabricated by diffusing a metal such as titanium into lithium niobate through a photolithographic mask. The electrodes are formed onto the waveguide structure such that the electrode starts at a point on a plane perpendicular to the waveguide and passing through the point where the branches begin. The electrodes extend a distance, $L$, as required for the mode to select one branch arm.

The operation of the devices shown in FIGS. 4–6 is the same as set forth above. Without an electric field applied, the optical radiation will divide evenly between the branching arms. Application of an electric field will change the index of the arms, depending on the polarity, to cause the radiation to select one of the arms; reversal of the electric field causes the other arm to be selected. Thus, the operation is as set forth above except that the structural arrangement is different.

The structural arrangement of the elements of FIGS. 4–6 utilizes the inherent instability associated with the operation of a symmetrical waveguide branch. Small index changes which drive the branch from one slightly asymmetric state to the opposite state are used to switch virtually all the power from one arm of the branch to the other arm of the branch. Thus, nearly complete switching or amplitude modulation is provided. Since the device makes use of the electro-optic effect, switching is very fast therefore the system may be used for optical communication applications.

The device has been described with an electro-optic region in which an electric field produces switching or modulation. Other arrangements for index changing may be used such as rotation of a birefringent liquid crystal, temperature change, changing the cladding layer by use of a liquid crystal layer, magneto-optic, etc. and any others that may be obvious to one skilled in the art.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An active optical waveguide for modulation or switching of optical power which comprises:
    a main waveguide section which propagates only a single local normal mode,
    said main waveguide branching into first and second diverging branching waveguide sections in a geometrically symmetrical manner with said branches lying in a horizontal plane with a spacing between said branching waveguide sections,
    said branching waveguide sections having a small included angle which is sufficiently small that optical modes will propagate adiabatically;
    first and second axially symmetric electrodes extending along said branching waveguide sections opposite their outer faces,
    said first electrode positioned opposite said first branching waveguide section,
    said second electrode positioned opposite said second branching waveguide section;
    a third electrode covering the spacing between said first and second branching waveguide sections and so positioned that the distances between the outer faces of said third electrode and the inner faces of said first and second electrodes are axially symmetrical and decrease along the length of said first and second branching waveguide sections in the direction away from said main waveguide; and
    means for applying a voltage to said electrodes such that said third electrode is made positive or negative in voltage with respect to said first and second electrodes thereby electro-optically raising the index of refraction of one branching waveguide section and lowering by the same amount the index of refraction of the other branching waveguide section,
    whereby optical power is directed to one branching waveguide section during application of one polarity potential and to the opposite branching waveguide section during application of the opposite polarity potential.

2. An active optical waveguide as claimed in claim 1, in which:
    said first and second electrodes are equidistant from the axis of said waveguide along their entire length along said first and second branching waveguide sections; and
    said first and second branching waveguides are curved along their length with the included angle sufficiently small at each point to allow adiabatic propagation.

3. An active optical waveguide as claimed in claim 1, in which:
    said first and second electrodes are straight and sloped toward the divergent ends of said first and second branching waveguides and
    said first and second branching waveguides are straight with the spacing there between becoming greater along their axial length extending from said main waveguide.

4. An active optical waveguide as claimed in claim 1, in which:
    said first and second electrodes are straight and sloped toward the divergent ends of said first and second branching waveguides.

* * * * *